United States Patent [19]
Miller

[11] Patent Number: 5,954,344
[45] Date of Patent: Sep. 21, 1999

[54] INTERLOCKING END MEMBERS FOR AN EXPANDABLE COMPRESSION RING

[75] Inventor: Michael R. Miller, Churubusco, Ind.

[73] Assignee: Press-Seal Gasket Corporation, Fort Wayne, Ind.

[21] Appl. No.: 08/872,363

[22] Filed: Jun. 10, 1997

[51] Int. Cl.⁶ ........................................... F16L 17/00
[52] U.S. Cl. ...................... 277/616; 24/615; 24/DIG. 22
[58] Field of Search ............................ 277/603, 611, 277/616, 637, 906, 925, 606, 493, 499; 24/615, 616, 507, 575, 576, 577, 578, DIG. 22; 285/910; D11/218; 59/79.1

[56] References Cited

U.S. PATENT DOCUMENTS

| | | | |
|---|---|---|---|
| 1,117,083 | 11/1914 | Patchell | 29/223 |
| 1,172,369 | 2/1916 | Kottusch | 277/495 |
| 1,211,692 | 1/1917 | Endebrock et al. | 277/499 |
| 1,225,101 | 5/1917 | Ballmer | 277/495 |
| 1,274,038 | 7/1918 | Hilker | 277/499 |
| 1,276,832 | 8/1918 | Schmitt | 277/499 X |
| 1,359,596 | 11/1920 | Hill | 277/474 |
| 1,768,392 | 6/1930 | Benien | 24/115 R |
| 2,075,194 | 3/1937 | Gibson | 24/DIG. 22 |
| 3,101,743 | 8/1963 | Hoke | 138/97 |
| 3,141,687 | 7/1964 | Broberg et al. | 285/397 |
| 3,293,978 | 12/1966 | Handley | 411/407 |
| 3,327,362 | 6/1967 | Bousquet | 24/575 |
| 3,406,988 | 10/1968 | Jones | 285/24 |
| 3,449,916 | 6/1969 | Tabor | 405/153 |
| 3,656,771 | 4/1972 | Stout | 277/607 |
| 3,700,265 | 10/1972 | Dufour et al. | 285/15 |
| 3,759,280 | 9/1973 | Swanson | 137/363 |
| 3,775,969 | 12/1973 | Vasterling | 59/79.1 X |
| 3,808,937 | 5/1974 | Roehrig | 411/407 |
| 3,813,116 | 5/1974 | Horsley | 285/236 |
| 3,814,409 | 6/1974 | Prasse | 267/1.5 |
| 3,866,925 | 2/1975 | Maimstrom et al. | 277/618 |
| 3,958,313 | 5/1976 | Rossborough | 29/890.14 |
| 3,960,395 | 6/1976 | Cirule | 285/370 |
| 3,973,783 | 8/1976 | Skinner et al. | 277/606 |
| 4,017,089 | 4/1977 | Kurata et al. | 277/634 |
| 4,103,901 | 8/1978 | Ditcher | 277/606 |
| 4,191,390 | 3/1980 | Wolf et al. | 277/616 |
| 4,203,190 | 5/1980 | Temple et al. | 29/451 |
| 4,215,868 | 8/1980 | Skinner et al. | 277/314 |
| 4,242,164 | 12/1980 | Skinner | 277/606 X |
| 4,281,944 | 8/1981 | Bowman | 404/26 |
| 4,387,900 | 6/1983 | Ditcher et al. | 277/616 X |
| 4,466,219 | 8/1984 | Campolito | 52/20 |
| 4,478,437 | 10/1984 | Skinner | 285/189 |
| 4,582,450 | 4/1986 | Neil | 404/26 |
| 4,702,645 | 10/1987 | Skinner et al. | 405/154 |
| 4,746,127 | 5/1988 | Westhoff et al. | 277/314 |
| 4,864,684 | 9/1989 | Gellenthin, Jr. | 16/2.1 |
| 4,890,863 | 1/1990 | Westhoff et al. | 277/606 |
| 5,029,907 | 7/1991 | Gundy | 285/230 |
| 5,042,532 | 8/1991 | Gilleland | 138/98 |
| 5,054,794 | 10/1991 | Westhoff et al. | 277/314 |
| 5,150,927 | 9/1992 | Skinner | 285/189 |
| 5,208,952 | 5/1993 | Mintel et al. | 24/575 X |
| 5,213,341 | 5/1993 | Griffiths | 277/606 |
| 5,507,500 | 4/1996 | Skinner et al. | 277/606 |
| 5,570,890 | 11/1996 | Skinner et al. | 277/606 |
| 5,653,004 | 8/1997 | Russo | 24/575 |

FOREIGN PATENT DOCUMENTS

| | | |
|---|---|---|
| 0 021 454 | 7/1978 | European Pat. Off. . |
| 476019 | 11/1937 | United Kingdom . |
| 1526123 | 9/1978 | United Kingdom . |

*Primary Examiner*—Lynne A. Reichard
*Assistant Examiner*—Greg Binda
*Attorney, Agent, or Firm*—Barnes & Thornburg

[57] ABSTRACT

Interlocking end members for expandable compression rings. Compression rings are formed by attaching the interlocking members to the ends of a flexible strip and coupling the interlocking members together. The interlocking members include a recess for receiving the ends of a flexible strip and a jaw structure for engagement with one another. The jaw structure includes two or more offset opposed jaw members which include angled teeth. The teeth of opposed jaw members of coupled interlocking members engage one another in a locking relationship, whereby the resulting compression ring can be expanded and locked into a range of positions.

17 Claims, 4 Drawing Sheets

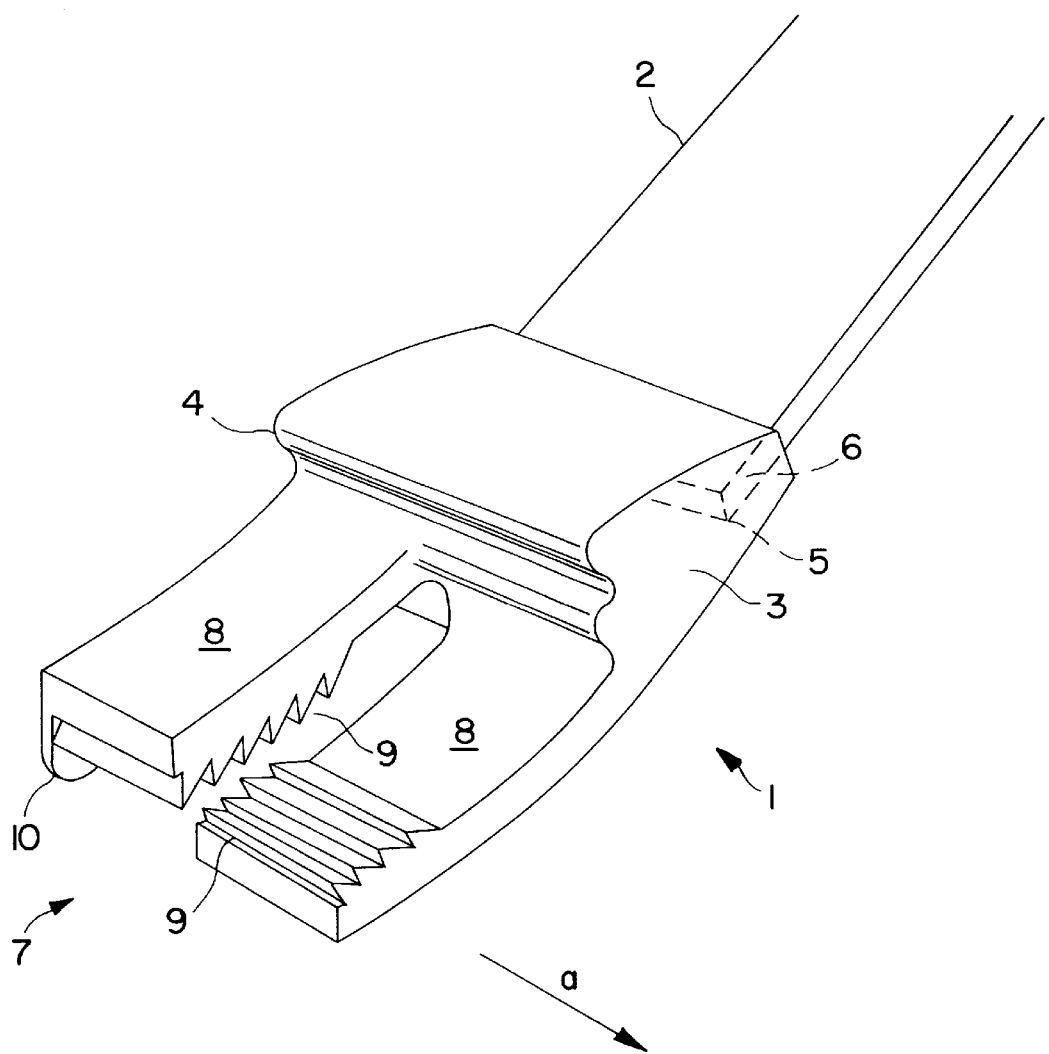
FIG. 1
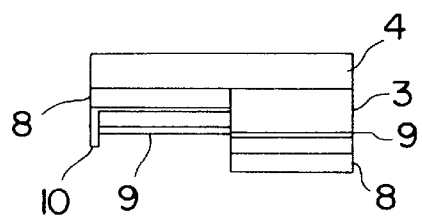
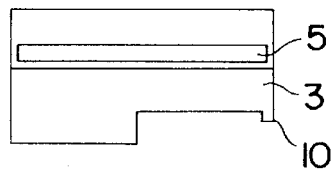

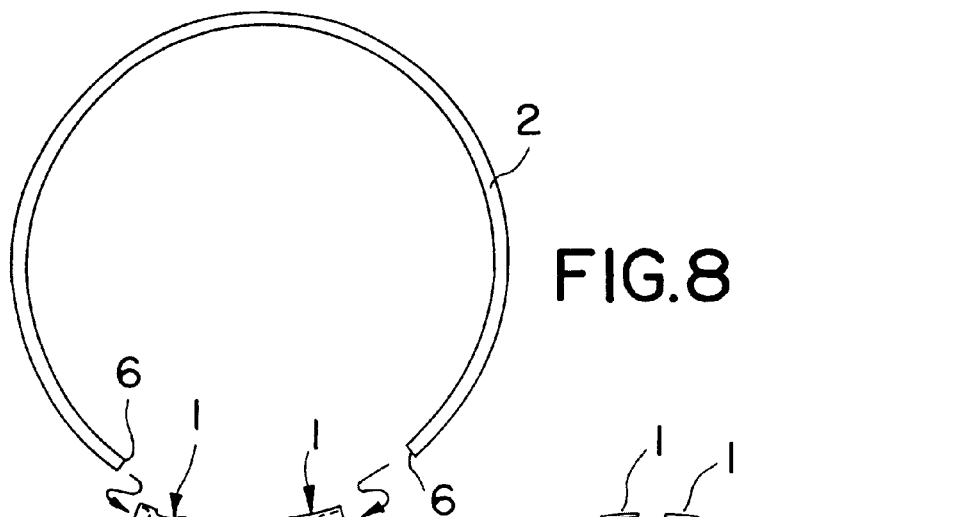
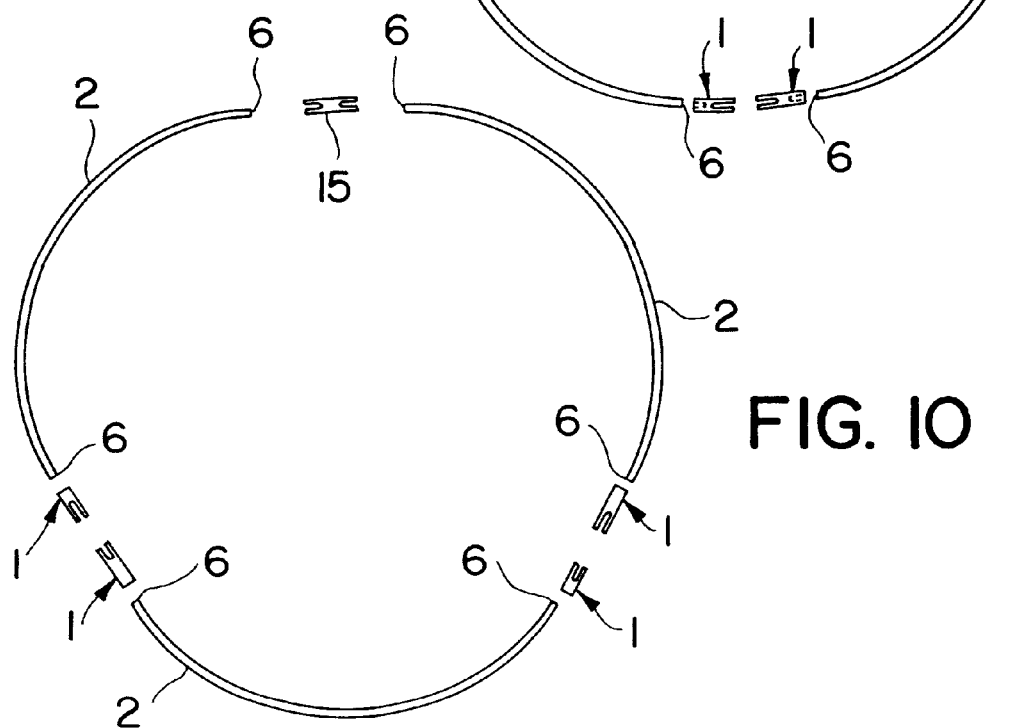
FIG. 8
FIG. 9
FIG. 10

INTERLOCKING END MEMBERS FOR AN EXPANDABLE COMPRESSION RING

TECHNICAL FIELD

The present invention relates to an expandable seal arrangement. More particularly, the present invention relates to an expandable compression ring with interlocking end members for exerting an outward, radially directed force on an inner surface of a gasket to compress the gasket into sealing engagement with the surface of an opening.

BACKGROUND ART

Compression rings are used to clamp the exterior surface of resilient gaskets surrounding a pipe into sealing engagement with a wall of an opening into which the pipe is inserted. These gaskets are typically constructed from an elastomeric material and, when clamped into position, provide a fluid-tight seal between the pipe and the opening. Clamping is accomplished by expanding the compression ring against an interior surface of the gaskets.

Expandable compression rings may be in the form of either a unitary plastic structure or a unitary metal structure. Utilization of unitary plastic rings has some drawbacks. First, a unitary construction requires that an entire plastic band be formed from a relatively expensive, high strength material. Such a high strength material is necessary particularly around the areas where an expansion tool is to be connected to the ring during clamping of a gasket in an opening. Pressure on the order of several hundred pounds per square inch can be exerted by such an expansion tool. In addition, locking structures provided on plastic compression rings to secure the rings in an expanded position are subjected to large forces and thus require a high degree of strength. Another drawback of forming expandable compression rings from plastic is that a separate mold is required for each ring that is designed to be used in conjunction with a particular range of opening diameters. These molds are expensive. The expense for such molds is particularly difficult to bear for larger sized opening diameters where market demand drops off rapidly.

Plastic expandable compression rings, however, do have advantages. One of these advantages is that plastic expandable compression rings can be integrally formed by a molding process that does not require separate forming steps, such as welding. Thus, the manufacturing processes associated with plastic rings can be less labor intensive and less expensive than with metal rings. Another advantage of plastic rings is that they are not subject to corrosion. Rings made from metal can corrode due to the hostile environment in which compression rings are often used. Chemical elements such as sulfur and compounds such as sulfuric acid can, over time, corrode and degrade the structural integrity of rings made from metal.

Metal expandable compression rings, however, do have advantages. One of these advantages is that metal expandable compression rings do not require molds to be formed. Such rings can be stamped rather than formed from a mold. Certain sizes of metal rings may thus be cheaper to manufacture where market demand is low even though manual labor may be necessary for their partial assembly. The materials costs for metal rings made from such material as stainless steel are also less expensive than unitary reinforced plastic rings. Finally, metal rings do not suffer from a buckling or creeping problem occurring in some plastic rings.

U.S. Pat. No. 5,507,500 to Skinner et al. discloses an expandable compression ring design which includes moldable locking end members which can be used with continuous strips of a resilient flexible material. The separate locking end members are attached to the ends of the continuous strips and include opposed teeth which engage one another for purposes of locking the ring in an expanded position.

The present invention provides an interlocking structure for expandable compression rings.

DISCLOSURE OF THE INVENTION

The present invention provides interlocking end members for expandable compression rings which interlocking end members include jaw structures for engagement of identical pairs of the interlocking end members. The interlocking end members include recesses by which they can be coupled to the free ends of a flexible strip. The jaw structures include two or more opposed jaw members which are offset from one another. The offset jaw members of one interlocking end member are received by the offset jaw members of another interlocking member, whereby opposed jaw members on opposite ones of coupled interlocking end members engage one another. The interlocking end members further include engagement structures such as lugs by which an expansion tool can be used to push apart and expand engaged pairs of the interlocking end members.

The present invention also provides expandable compression rings which include one or more pairs of the interlocking end members and one or more lengths of flexible strips, and optionally one or more non-expandable strip couplers. The interlocking members include the jaw structures described herein and are preferably formed integrally from a plastic material or a reinforced plastic material. The flexible strips can be made of a plastic material or a metal.

The present invention provides interlocking end members for expandable compression rings which resist rotation and provide incremental ranges of adjustment or expansion.

BRIEF DESCRIPTION OF DRAWINGS

The present invention will be described hereafter with reference to the attached drawings which are given as non-limiting examples only, in which:

FIG. 1 is a perspective view of an end of an expandable ring according to one embodiment of the present invention.

FIG. 2 is a front end view of an interlocking member according to one embodiment of the present invention.

FIG. 3 is a rear end view of the interlocking member of FIG. 2.

FIG. 8 is a side view of an expandable compression ring that is formed from a single flexible strip and a pair of interlocking members.

FIG. 9 is a side view of an expandable compression ring that is formed from a pair of flexible strips and two pairs of interlocking members.

FIG. 10 is a side view of an expandable compression ring that is formed from three flexible strips, a coupler and a pair of interlocking members.

BEST MODE FOR CARRYING OUT THE INVENTION

Figure 4:
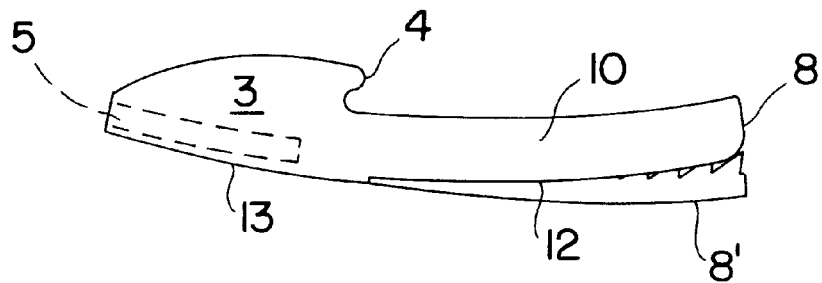
FIG. 4 is a side view of the interlocking member of FIG. 2.

The present invention is directed to expandable compression rings which can be used to exert a radial sealing force on deformable elastomeric materials. The expandable compression rings include interlocking end members, and one or more flexible strips. The interlocking end members are designed to be coupled to free ends of the flexible strips. According to one embodiment, a single flexible strip is used and the interlocking end members are coupled to the ends thereof. According to further embodiments, two or more flexible strips which are coupled together can have the interlocking members coupled to their free ends.

The interlocking members are molded and/or machined structures which are preferably integrally formed. Each of the interlocking members includes a jaw structure having at least two offset opposed jaw members that are engagable with corresponding offset opposed jaw members of another identical interlocking member. The offset opposed jaw members of each interlocking member are provided with a plurality of teeth which are angled so as to engage similar teeth of another interlocking member. These teeth allow the resulting compression ring to be locked into one of its multiple expanded positions.

The jaw members of each interlocking member extend from a main body portion and at least one of the jaw members is resiliently flexible with respect to the main body portion and the other jaw member(s). This flexibility allows the jaw members to "open" and thereby slide over and engage the jaw members of another interlocking member. The main body of the interlocking members includes a recess for receiving the end of a flexible strip.

According to one embodiment, each interlocking member includes two offset opposed jaw members. However, it is possible to include more than two offset opposed jaw members.

The jaw members are preferably made, e.g., molded and/or machined from a plastic material, such as nylon which can be reinforced for added strength. The flexible strips can be made from a plastic material, a metal, a laminate, or any suitable strong flexible material. The ends of the flexible strips can include stepped portions or tenons which provide a smooth transitional surface where the flexible strips are coupled to the interlocking members. Ideally, there is little or no step or discontinuity at the intersection where the interlocking members are coupled to the flexible strips. This ensures that the resulting compression ring will have a substantially smooth continuous uninterrupted outer surface.

The interlocking members also include lug structures that are engagable with an expansion tool that is used to expand the compression ring into one of its multiple locked positions. In an alternative embodiment engagement holes can be provided in the flexible strips, which engagement holes can be used in conjunction with an expansion tool that is used to expand the compression ring. The ability to expand the compression ring into multiple locked positions allows for a range of opening diameters to be accommodated.

FIG. 1 is a perspective view of an end of an expandable ring according to one embodiment of the present invention. FIG. 1 depicts an interlocking member 1 which is coupled to an end of flexible strip 2. According to the embodiment of the invention depicted in FIG. 1, the interlocking member 1 includes a main body portion 3 which includes an engaging structure or lug 4 that is designed to be engaged by a conventional installation tool, e.g. an expansion tool. The end of the main body portion 3 includes a recess 5 which receives end 6 of a flexible strip 2.

A jaw structure 7 extends from the main body portion 3 and includes two offset opposed jaw members 8. The jaw members 8 are offset from one another along the direction indicated by arrow "a." Direction "a" coincides with the longitudinal axis of the compression ring. The jaw members 8 each include a plurality of teeth 9. Teeth 9 are angled outwardly from the main body position 3 as depicted in FIG. 1 so that they can engage the teeth 9 of a corresponding interlocking member 1 which is provided on the opposite end of flexible strip 2. One of the jaw members 8 include a ridge or tab 10 along the outer side thereof. This ridge or tab 10 blocks or prevents lateral sideways movement of two coupled interlocking members 1 as discussed below.

FIG. 2 is a front end view of an interlocking member according to one embodiment of the present invention. In FIG. 2, the engaging structure or lug 4 is depicted as extending across the width of the main body portion 3 of the interlocking member 1, above the jaw structure 7. As shown in FIG. 2, the jaw members 8 are offset along the width of the interlocking member 1 so that, at most, only the adjacent inner side edges of the jaw members 8 are aligned. The teeth 9 of the jaw members 8 are depicted as a series of nearly over-lapping lines in FIG. 2 due to the curved shape of the jaw members 8 which is discussed below. Ridge or tab 10 is depicted as extending from the side of one of the jaw members 8 in FIG. 2. The space 11 above the teeth 9 of each jaw member 8 receives the jaw member(s) of a similar interlocking member 1. That is, when interlocking members 1 having similar offset opposed aligned jaw members 8 are brought into face-to-face abutment and are pushed together, the teeth 9 of their respective jaw members 8 pass over one another and interlock.

FIG. 3 is a rear end view of the interlocking end member of FIG. 2. FIG. 3 depicts one embodiment of a recess 5 which is provided in the main body member 3 for coupling the interlocking member 1 to a flexible strip 2.

Figure 5:
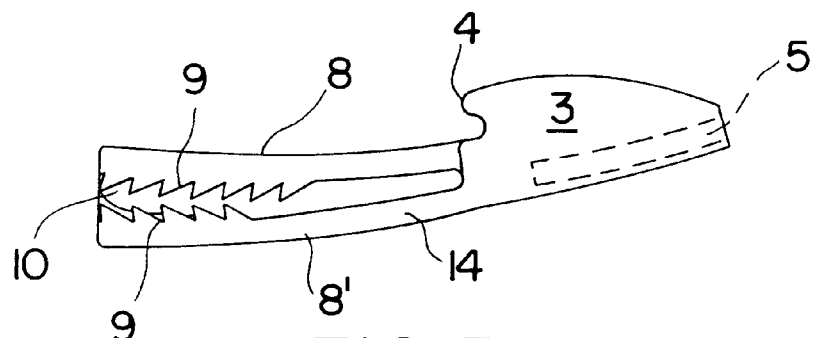
FIG. 5 is a side view of the interlocking member of FIG. 2 taken from the opposite side shown in FIG. 4.

FIG. 4 is a side view of the interlocking member of FIG. 2. The side view of FIG. 4 shows the ridge or tab 10 as being continuous along the length of the upper jaw member 8. In an alternate embodiment, the ridge or tab 10 could be discrete as opposed to being continuous with the length of the upper jaw member 8. For example, a smaller length ridge or tab could be provided adjacent the end of the upper jaw member 8 or anywhere along the upper jaw 8. The terms "upper" and "lower" jaw member used herein are made in reference to the base of the jaw members from which the teeth extend as depicted. The teeth 9 of the upper jaw member 8 project downward from the base of the upper jaw member 8 in the drawing. The teeth 9 of the lower jaw member 8' project upward from the base of the lower jaw member 8' in the drawings. As depicted, the lower surface 12 of the ridge or tab 10 forms a substantially continuous arc with the lower surface 13 of the main body portion 3 of the interlocking member 1. This substantially continuous arc should have a radius which is approximately equal to the internal radius of a gasket that is fully compressed in a sealing relationship with an opening. Because the upper jaw member 8 has the ridge or tab 10 on the outer side thereof, the upper jaw member 8 resists being flexed. On the other hand, the lower jaw member 8' is resiliently flexible with respect to the upper jaw member 8 and with respect to the main body portion 3, and therefore will conform somewhat to the internal radius of a compressed gasket. The upper jaw member 8 also is curved along its length as depicted in FIGS. 4 and 5. However, the upper jaw member 8 and lower jaw member 8' have offset radii of curvatures which provide the depicted radial spacing between the teeth 9 of each jaw member 8.

FIG. 5 is a side view of the interlocking member of FIG. 2 taken from the opposite side from FIG. 4. In FIG. 5 ridge or tab 10 is along the back of teeth 9 of the upper jaw member 8. The radial spacing between the teeth 9 of each jaw member 8 and the angle of the teeth 9 with respect to the base of each jaw member 8 are depicted in FIG. 5. The smooth portion 14 of the lower jaw member 8' which extends between the main body portion 3 and the teeth 9 allows the lower jaw member 8' to be flexible. As discussed above, the ridge or tab 10 causes the upper jaw member 8 to resist being flexed.

Figure 6:
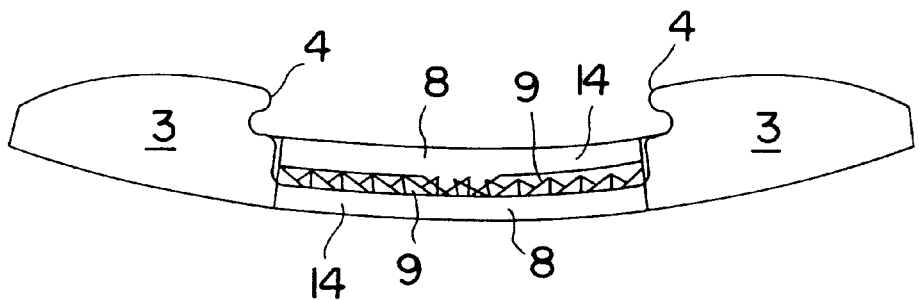
FIG. 6 is a side view of two interlocking members in their engaged, but non-expanded positions.

FIG. 6 is a side view of two interlocking members in their engaged, but non-expanded positions. As shown in FIG. 6, the free ends of the jaw members 8 abut the main body portions 3 of the opposite interlocking members 1. In FIG. 6 the ridge or tab 10 of the left-hand interlocking member 1 is deleted so that the teeth 9 of the jaw members 8 can be seen. Because the free ends of the jaw members 8 abut the main body portion 3 of the opposite interlocking member 1, the toothed portions of the jaw members 8 are aligned with the smooth portions 14 of the opposed jaw members 8. That is, the teeth 9 of the opposed jaw members 8 are not engaged in FIG. 6. The lug structures 4 face one another when the interlocking members 1 are coupled so that they can be engaged with a conventional expansion tool which can be used to exert an outward expanding force between the lug structures 4.

Figure 7:
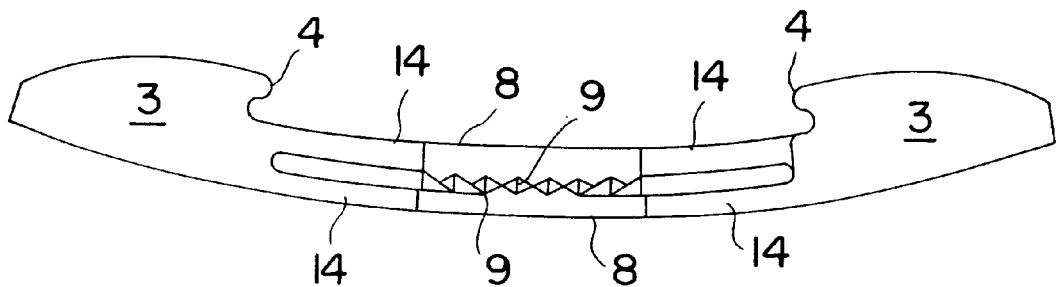
FIG. 7 is a side view of the two interlocking members of FIG. 6 in an expanded position.

FIG. 7 is a side view of the two interlocking members of FIG. 6 in an expanded position. This position of the interlocking members 1 is achieved by pushing the interlocking members 1 as depicted in FIG. 6 apart from each other, for example by the use of an expansion tool. In the expanded position, the opposed teeth 9 of the upper and lower jaw members 8 engage with each other and lock the interlocking members 1 in the position depicted in FIG. 7. FIG. 7 depicts the interlocking members 1 in an expanded position in which substantially all the opposed teeth 9 are engaged together. It is possible to move the interlocking members 1 less or further apart from their illustrated positions in FIG. 7, and have proportionally fewer of the teeth 9 engage one another. Thus, it can be understood that there is an adjustable range of positions that the interlocking members 1 can assume to provide for corresponding degrees of expansion of an expandable compression ring.

FIG. 8 illustrates a side view of an expandable compression ring that is formed from a single flexible strip and a pair of interlocking members. In this embodiment, interlocking members 1 are provided on each of the ends 6 of the flexible strip 2.

FIG. 9 illustrates a side view of an expandable compression ring that is formed from a pair of flexible strips and two pairs of interlocking members. In this embodiment, the ends 6 of each flexible strip 2 are provided with an interlocking member 1. The use of two (or more) interlocking members 1 on a single expandable compression ring allows for a wider range of radial expansion or adjustment.

FIG. 10 illustrates a side view of an expandable compression ring that is formed from three flexible strips, a coupler and a pair of interlocking members. This embodiment of the invention depicts how two or more flexible strips 2 can be joined together by either couplers 15 or by one or more pairs of interlocking members 1. Moreover, this embodiment depicts how couplers 15 or pairs of interlocking members 1 can be alternatively used in an expandable compression ring that includes more that one flexible strip 2. In such rings, at least one pair of interlocking members 1 are required in order to provide for expansion. More interlocking member pairs 1 will increase the range of radial expansion or adjustment.

Figure 11:
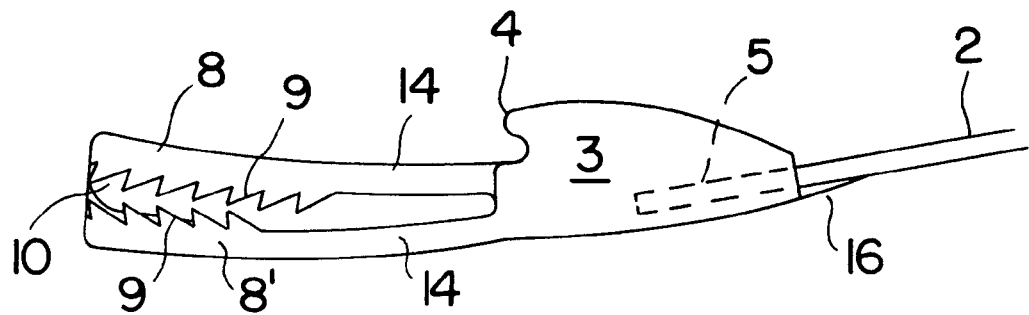
FIG. 11 is a cross sectional view of an alternative embodiment of an interlocking member according to the present invention.

FIG. 11 is a cross sectional view of an alternative embodiment of an interlocking member according to the present invention. The exterior shape of the interlocking member 1 of FIG. 11 is similar to that of FIGS. 1–7. This embodiment of the interlocking member 1 includes a tapered extension 16 below recess 5 which provides a smooth, step-free transitional area between the lower surface of the interlocking member 1 and the flexible strip 2 as depicted in FIG. 11. This smooth, step-free transition area provides an even sealing pressure against a gasket.

Figure 12:
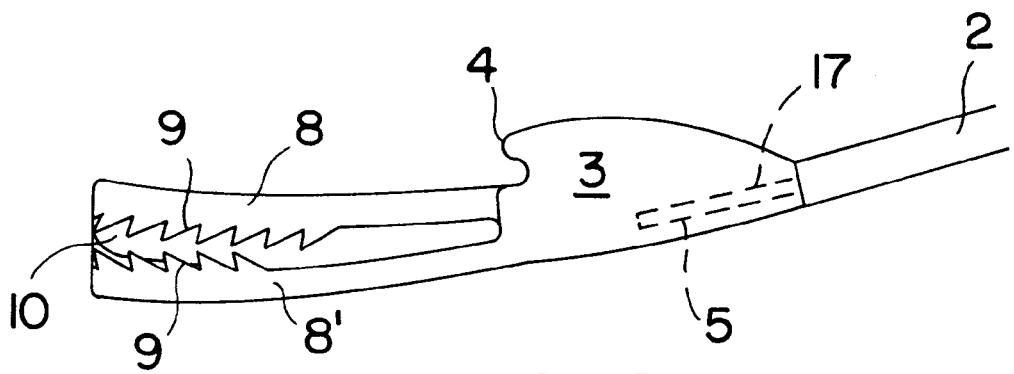
FIG. 12 is a cross sectional view of an alternative embodiment of a flexible strip according to one embodiment of the present invention.

FIG. 12 is a cross sectional view of an alternative embodiment of a flexible strip according to one embodiment of the present invention. In this embodiment, the end of the flexible strip 2 is provided with a tenon 17 which, when inserted into recess 5 of the interlocking member 1, provides a smooth, step-free transitional area between the lower surface of the interlocking member 1 and the flexible strip 2 as depicted.

Figure 13:
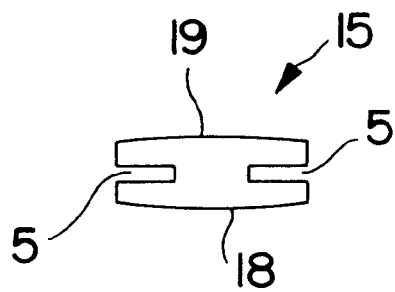
FIG. 13 is a cross sectional side view of a flexible strip coupler according to the present invention.

FIG. 13 is a cross sectional side view of a flexible strip coupler according to the present invention. As depicted, the coupler 15 includes recesses 5 in opposite ends thereof. These recesses 5 can have the shape of the recesses 5 depicted in FIGS. 11 or 12. The lower surface 18 of the coupler 15 is curved as depicted and has a radius which is approximately equal to the internal radius of a gasket that is fully compressed in a sealing relationship with an opening. The upper surface 19 of the coupler can be flat or curved to reduce fluid flow resistance. The lower edges of recesses 5 can have the tapered structure 16 of FIG. 11 if desired. The coupler 15 can also be used in conjunction with a flexible strip having the ends depicted in either FIG. 11 or 12.

Figure 14:
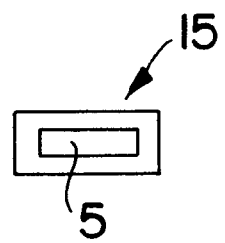
FIG. 14 is an end view of the flexible strip coupler of FIG. 13.

FIG. 14 is an end view of the flexible strip coupler of FIG. 13. As seen, the width of the coupler 15 has a generally rectangular cross sectional shape.

The use of the offset opposed jaw members on the interlocking members of the present invention will resist axial rotation or deformation of the compression ring at the interlocking members. Because the present invention utilizes the same interlocking member design on both free ends of a flexible strip, it is not necessary to match pairs of interlocking members. Moreover, the use of a single interlocking member design reduces production mold costs, because only a single mold design is needed to produce interlocking members for a given compression ring design.

The interlocking members of the present invention are used by first engaging pairs thereof in the non-expanded configuration depicted in FIG. 6. The interlocking members can be engaged by aligning a pair face-to-face with one of the interlocking pair members rotated about its axis at approximately 90°. In this orientation, the interlocking members can be pushed together, and then rotated into the position depicted in FIG. 6. Alternatively, the jaw members which are not provided with the ridge or tab along the side thereof, can be flexed outward so that the interlocking members can be pushed together. This latter manner of engaging the interlocking members may be more suitable for manufacturing pre-engaged interlocking members.

Once the interlocking members are engaged as depicted in FIG. 6, the free ends of a flexible strip are inserted into the recesses of the interlocking members. The resulting compression ring is inserted inside a gasket which is positioned inside an opening such as an opening in a manhole. With the compression ring in position inside a gasket, an expansion tool is positioned so that it engages the lug structures on each pair of interlocking members. The expansion tool is activated, causing the engaged interlocking members to move apart so that the teeth of the opposed jaw members of each interlocking member engage the teeth of the opposed jaw members of the other interlocking member. Because the teeth are angled, as indicated, they engage in a locking manner. When a compression ring with two or more pairs of interlocking members are used, each pair of interlocking members are expanded as described.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention as described by the claims which follow.

What is claimed:

1. An expandable compression ring which comprises:
   a strip of resiliently flexible material having first and second ends; and
   an interlocking member coupled to each of the first and second ends of the strip, each interlocking member including a jaw having at least two offset jaw members which is incrementally engagable with a similar jaw of another interlocking member, each of the at least two jaw members having free ends and opposed fixed ends, the fixed ends being fixed with respect to one another.

2. An expandable compression ring according to claim 1, wherein the jaw members are opposed to one another.

3. An expandable compression ring according to claim 1, wherein the jaw of each interlocking member includes a plurality of teeth.

4. An expandable compression ring according to claim 1, wherein the jaw members each include at least one tooth.

5. An expandable compression ring according to claim 4, wherein the jaw members each include a plurality of teeth.

6. An expandable compression ring according to claim 1, wherein the interlocking members include ridge structures which prevent relative lateral movement there between.

7. An expandable compression ring according to claim 1, wherein the interlocking members include means for engagement thereof by an expansion tool used to push engaged interlocking members apart.

8. An expandable compression ring according to claim 1, wherein the interlocking members include a recess for receiving the first and second ends of the continuous strip.

9. An expandable compression ring according to claim 1, wherein the strip includes at least two strips which are coupled together and have first and second free ends which free ends are coupled to the interlocking members.

10. An expandable compression ring according to claim 1, wherein the strip comprises a metal strip.

11. An expandable compression ring according to claim 1, wherein the interlocking members are made from a plastic material.

12. An expandable compression ring according to claim 1, wherein one of the jaw members of each interlocking member is substantially inflexible and another is flexible.

13. An interlocking member for expandingly securing together the ends of a flexible strip which comprises:
    a main body portion;
    a recess in an end of the main body portion for receiving the ends of a flexible strip; and
    a jaw having at least two offset jaw members which is incrementally engagable with a similar jaw of another interlocking member, each of the at least two jaw members having free ends and opposed fixed ends, the fixed ends being fixed with respect to one another.

14. An interlocking member according to claim 13, wherein the jaw members are opposed to one another.

15. An interlocking member according to claim 13, wherein each of the jaw members includes at least one tooth.

16. An interlocking member according to claim 13, wherein the interlocking member further includes means for engagement thereof by an expansion tool used to push engaged pairs of the interlocking members apart.

17. An interlocking member according to claim 13, further including a recess for receiving an end of a strip.

* * * * *